(12) United States Patent
Sudau et al.

(10) Patent No.: US 6,364,080 B1
(45) Date of Patent: Apr. 2, 2002

(54) ARRANGEMENT FOR THE ROTATIONALLY FIXED CONNECTION OF A HYDRODYNAMIC COUPLING DEVICE TO A DRIVE COMPONENT

(75) Inventors: Jörg Sudau; Erwin Wack, both of Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/556,574

(22) Filed: Apr. 24, 2000

(30) Foreign Application Priority Data

Apr. 22, 1999 (DE) .......................................... 199 18 279

(51) Int. Cl.$^7$ ............................................... F16H 45/02
(52) U.S. Cl. ........................ 192/3.21; 192/3.28; 464/98; 403/15
(58) Field of Search ............................... 192/3.21, 3.28, 192/3.29, 70.16, DIG. 1; 464/98, 99; 29/889.5, 446, 451; 403/15

(56) References Cited

U.S. PATENT DOCUMENTS

| | | | | |
|---|---|---|---|---|
| 4,502,279 A | * | 3/1985 | Fuehrer ........................ | 60/330 |
| 4,997,408 A | * | 3/1991 | Copeland ..................... | 464/98 |
| 5,172,608 A | * | 12/1992 | Schultz et al. ................ | 74/572 |
| 5,234,278 A | * | 8/1993 | Hall, III et al. ............. | 403/359 |
| 5,799,766 A | * | 9/1998 | Link et al. ................ | 192/70.16 |

FOREIGN PATENT DOCUMENTS

| | | | |
|---|---|---|---|
| DE | 198 10 352 A1 | * | 9/1999 |
| EP | 610 979 B1 | | 11/1996 |

* cited by examiner

*Primary Examiner*—Richard M. Lorence
(74) *Attorney, Agent, or Firm*—Cohen, Pontani, Lieberman & Pavane

(57) ABSTRACT

An arrangement for the rotationally fixed connection of a hydrodynamic coupling device to a drive component, in particular a drive shaft, has a first torque-transmission engagement formation, which is connected in a rotationally fixed manner to the drive component, a second torque-transmission engagement formation, which is connected in a rotationally fixed manner to the hydrodynamic coupling device and is in or can be brought into torque-transmitting engagement with the first torque-transmission engagement formation as a result of these formations being moved toward one another substantially in the direction of an axis of rotation, and a preloading device which preloads the hydrodynamic coupling device with respect to the drive component substantially in the direction of the axis of rotation. The first and second torque-transmission engagement formations are brought into or held in torque-transmitting engagement with one another by the preloading force generated by the preloading device.

13 Claims, 2 Drawing Sheets

ARRANGEMENT FOR THE ROTATIONALLY FIXED CONNECTION OF A HYDRODYNAMIC COUPLING DEVICE TO A DRIVE COMPONENT

BACKGROUND OF THE INVENTION

1. Field of the Invention

The present invention relates to an arrangement for the rotationally fixed connection of a hydrodynamic coupling device, in particular a torque converter or a hydraulic clutch, to a drive component, in particular a drive shaft.

2. Discussion of the Prior Art

European reference EP 0,610,979 B1 has disclosed an arrangement of this nature, in which a disk-like component is connected in a rotationally fixed manner to the drive component, which forms a drive shaft. A so-called flexiplate is connected to the torque converter in a rotationally fixed manner, and in the radially outer area the flexiplate and the disk-like component are connected to one another by means of a clamping ring. An arrangement of this nature is relatively expensive to produce. To release and produce the connection, the clamping ring has to be released or secured in a suitable manner, and there is a risk of the arrangement functioning incorrectly if the attachment using the clamping ring is excessively strong or insufficiently strong.

Furthermore, it is known to attach securing blocks to a converter casing of the torque converter, and for a flexiplate to be screwed onto the securing blocks radially on the outside, which flexiplate is in turn screwed onto the drive shaft radially on the inside. An attachment device of this nature also requires a relatively complex fitting operation, since all the screws which are used to screw the flexiplate onto the torque converter have to be tightened or loosened.

SUMMARY OF THE INVENTION

Therefore, the object of the present invention is to provide an arrangement for the rotationally fixed connection of a hydrodynamic coupling device to a drive component. The invention further relates to a method for producing a rotationally fixed connection of this nature, by means of which the connection can be produced in a simple and reliably functioning manner.

According to the invention, this object is achieved by means of an arrangement for the rotationally fixed connection of a hydrodynamic coupling device, in particular a torque converter or a hydraulic clutch, to a drive component, in particular a drive shaft. The arrangement comprises a first torque-transmission engagement formation, which is connected in a rotationally fixed manner to the drive component, and a second torque-transmission engagement formation, which is connected in a rotationally fixed manner to the hydrodynamic coupling device and is in or can be brought into torque-transmitting engagement with the first torque-transmission engagement formation as a result of these formations being moved toward one another substantially in the direction of an axis of rotation. The invention further has a preloading device which preloads the hydrodynamic coupling device with respect to the drive component substantially in the direction of the axis of rotation. The first and second torque-transmission engagement formations are brought into or held in torque-transmitting engagement with one another by the preloading force generated by the preloading device.

The arrangement according to the invention comprises two essential aspects: firstly, the two engagement formations create a torque-transmitting coupling, and secondly the preloading force which is generated ensures that the two engagement formations are held reliably in engagement during operation and also when at a standstill. It is therefore not necessary to tighten a large number of screws or to pull on an attachment ring in a defined manner in order to produce the connection and maintain this connection, as is the case in the prior art.

By way of example, it is possible for the first and second torque-transmission engagement formations each to comprise a toothing which is open axially toward the other respective torque-transmission engagement formation in the direction of the axis of rotation.

In order for it to be possible to generate the preloading force in a simple manner, it is proposed for the preloading device to act between a projection, which protrudes from the hydrodynamic coupling device in the direction of the axis of rotation, and the drive component.

A particularly simple and reliably operating structure can be obtained if the preloading device comprises a first support element on the drive component and a second support element on the projection. A preloading spring arrangement acts between the first and second support elements.

In this case, it is preferable for the second support element to be axially fixed to the projection or for the first support element to be axially fixed to the drive component and to be held in an axially movable but rotationally fixed manner on the projection. In order for it to be possible to produce the interaction between the preloading device and the drive component in a simple and reliable manner, it is proposed that the first support element is or can be connected to the drive component in an axially fixed manner by means of threaded engagement.

By way of example, it is possible for the first support element to have an external screw thread formation which is in or can be brought into engagement with an internal screw thread formation provided on the drive component.

In the arrangement according to the invention, when producing the connection between the hydrodynamic coupling device, on the one hand, and the drive component, on the other hand, it is expedient to ensure firstly that the preloading force is generated in a reliable manner and then that the rotationally fixed coupling is generated. For this purpose, the arrangement according to the invention preferably comprises an opposing force device which is able to generate an opposing force which is directed substantially oppositely to the preloading force generated by the preloading device. The opposing force device generates the opposing force in the event of the hydrodynamic coupling device moving onto the drive component in the axial direction, until the preloading device has moved into a fitted limit position, and then ceases to generate the opposing force, in order for the first and second engagement formations to be brought into engagement with one another by the preloading force generated by the preloading device.

By way of example, the opposing force device may be arranged on a device which bears the drive component, preferably on an engine block. Furthermore, it is possible for the opposing force device to be arranged on the coupling device or a component which is connected thereto in a rotationally fixed manner.

The generation of the opposing force by the opposing force device may, for example, be ended by reducing the axial length of this device. This can be achieved by altering the pressure of a fluid in the opposing force device.

The present invention furthermore relates to a subassembly, comprising a hydrodynamic coupling device, in particular a torque converter or a hydraulic clutch, having a coupling projection. A preloading device is coupled to the coupling projection, which preloading device comprises a coupling element which can move axially but is rotationally fixed on the coupling projection, is preloaded into a predetermined position with respect to the coupling projection by a preloading spring arrangement and is designed for axially and rotationally fixed coupling to a drive component. An engagement formation is also provided on the hydrodynamic coupling device, which engagement formation can be brought into torque-transmitting engagement with a corresponding engagement formation on the drive component.

The present invention furthermore relates to a method for the rotationally fixed connection of a hydrodynamic coupling device, in particular a torque converter or a hydraulic clutch, to a drive component comprising the following steps:
  a) moving an engagement formation which is provided on the hydrodynamic coupling device onto an engagement formation which is provided on the drive component;
  b) generating an opposing force which counteracts the engagement between the engagement formations;
  c) generating a preloading force between the hydrodynamic coupling device and the drive component, the preloading force being directed substantially in the opposite direction to the opposing force; and
  d) after the preloading force has been generated, ending the generation of the opposing force and thus bringing the engagement formations into engagement by means of the preloading force, which has been at least partially maintained.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
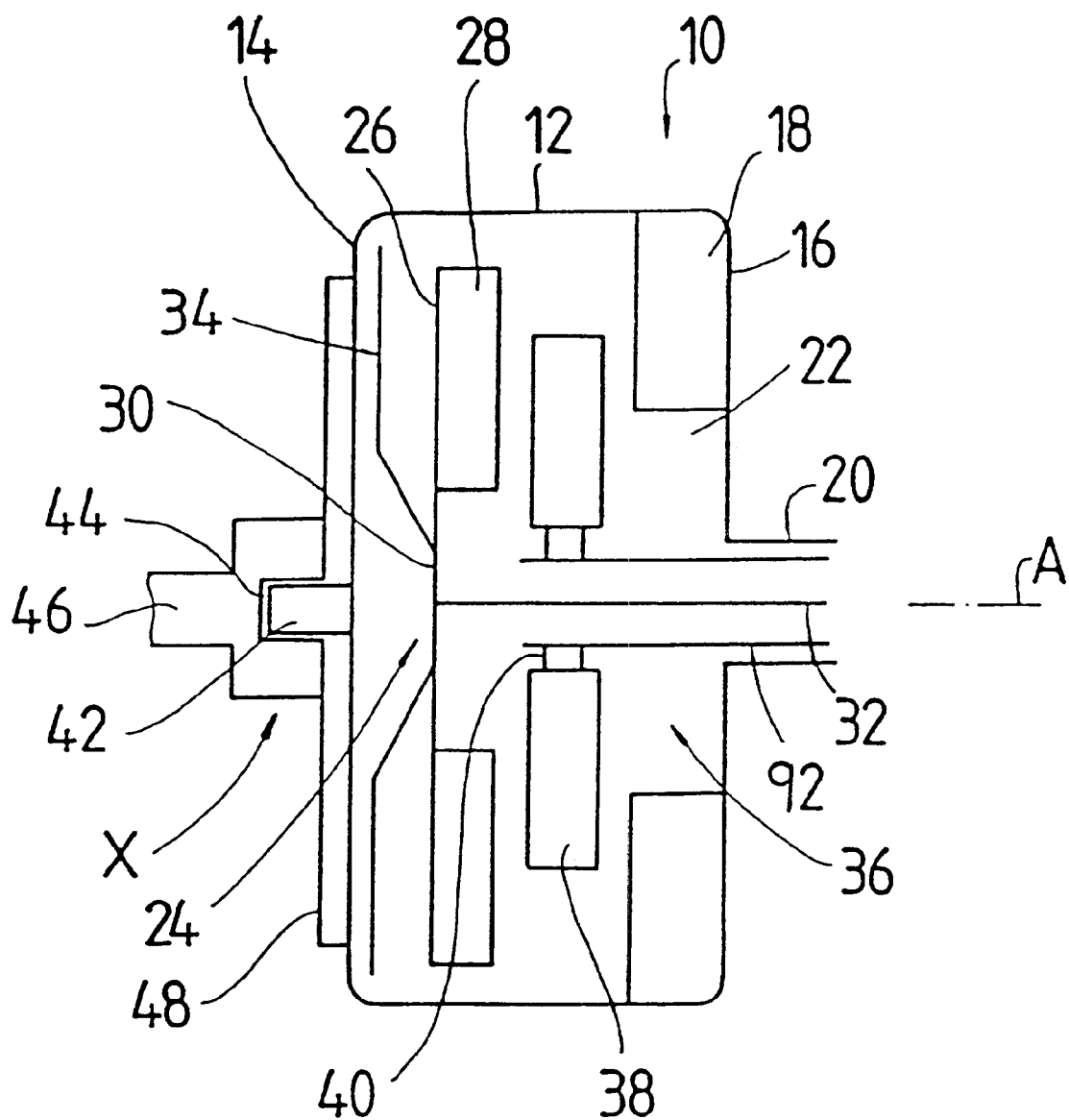
FIG. 1 shows a diagrammatic longitudinal section through a torque converter.

First of all, the general structure of a torque converter 10 is described with reference to FIG. 1. The converter 10 comprises a converter casing 12, which on one side, which faces toward an internal combustion engine (not shown), has a cover 14 and a pump impeller shell 16 connected in a fixed manner to the cover 14. On its radially outer area, the pump impeller shell 16 bears a plurality of pump impeller blades 18, while radially on the inside it is connected in a rotationally fixed manner to a pump impeller hub 20. The pump impeller hub 20 drives a fluid pump, by means of which working fluid is conveyed into the interior 22 of the torque converter 10.

Furthermore, a turbine impeller 24 is arranged in the interior 22. The turbine impeller 24 comprises a turbine impeller shell 26, which bears a plurality of turbine impeller blades 28 and, radially on the inside, is connected in a rotationally fixed manner to a turbine impeller hub 30. The turbine impeller hub 30 is in turn connected in a rotationally fixed manner to an output shaft 32, generally a transmission input shaft. A lockup clutch 34, which is only outlined in FIG. 1, can produce a rotationally fixed coupling between the converter casing 12 and the turbine impeller 24 by suitably regulating the fluid pressure prevailing in the interior 22.

A stator 36 with a plurality of stator blades 38 arranged on it is provided axially between the pump impeller shell 16 and the turbine impeller 24. The stator 36 is mounted on a support shaft 92 by means of a freewheeling mechanism 40.

On the converter casing 12 or on its cover 14 there is an axial projection 42, which extends toward the drive unit and engages in a recess 44 which is formed in an end face of a drive shaft 46 of the drive unit, for example a crankshaft. By means of the projection 42 engaging in the recess 44, it is possible to radially center the torque converter 10 with respect to the drive shaft 46. A rotational connection between the drive shaft 46 and the torque converter 10 is provided by a flexible plate 48, also known as a flexiplate. Radially on the inside, this flexiplate 48 is connected in a rotationally fixed manner to the drive shaft 46, in a manner described below, and radially on the outside it is connected in a rotationally fixed manner to the converter casing 12. The elasticity of the flexiplate 48 allows the torque converter 10 to execute tumbling movements with respect to the drive shaft 46 in the event of rotation about an axis A. These movements may occur, for example, if the axis of rotation of the converter 10 and the axis of rotation of the drive shaft 46 are not precisely aligned.

Figure 2:
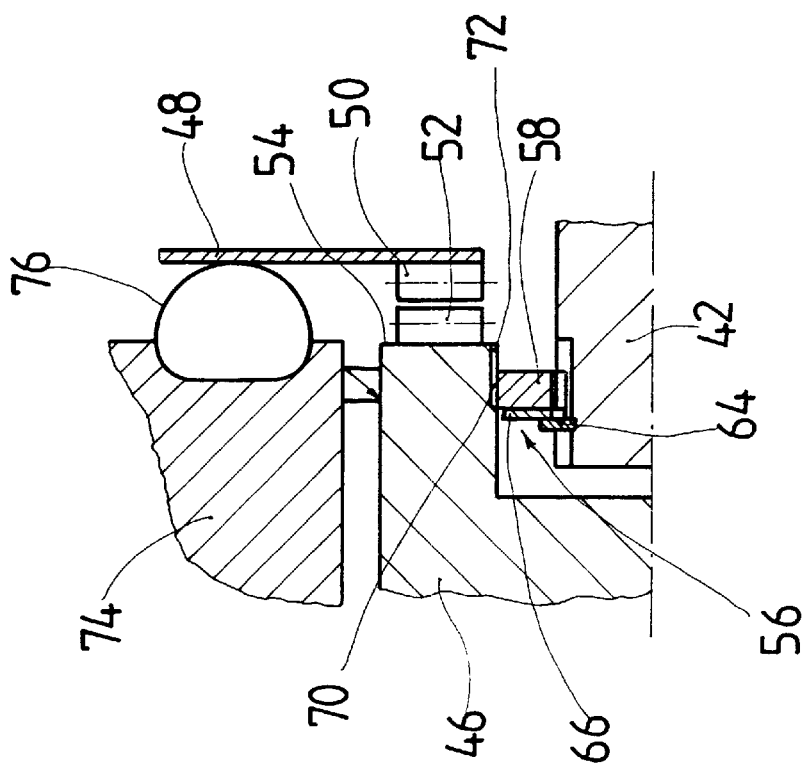
FIG. 2 shows a partial longitudinal section through an arrangement according to the invention for rotationally coupling the torque converter to a drive shaft, with the rotational coupling already produced.
Figure 3:
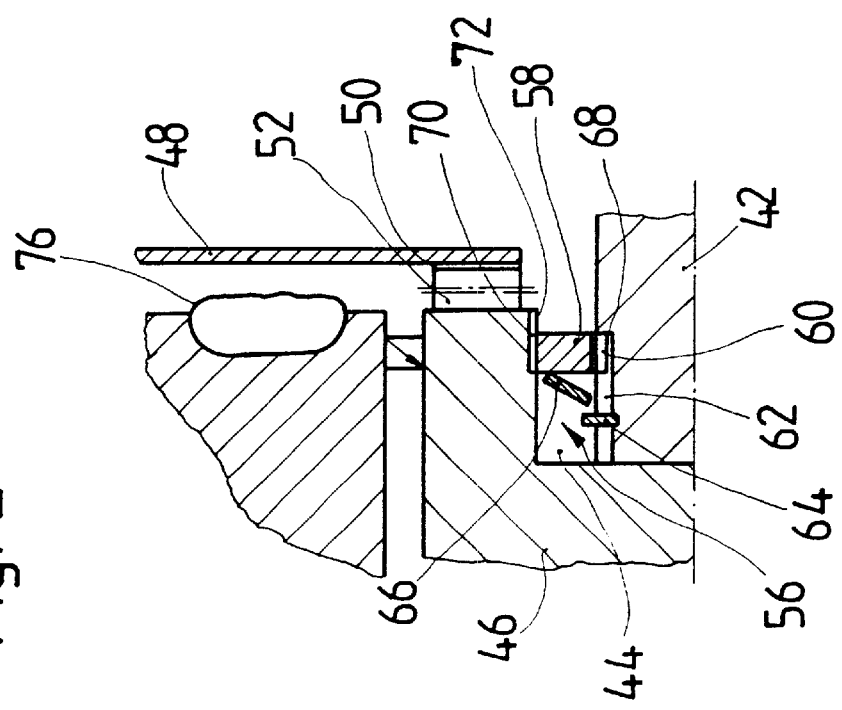
FIG. 3 shows the arrangement illustrated in FIG. 2 during the operation of connecting the torque converter to the drive component.

FIGS. 2 and 3 show the way in which the rotationally fixed coupling is produced between the flexiplate 48 and the drive shaft 46. In its radially inner area, the flexiplate 48 bears axial toothing 50, for example radial serrations, which in this case has teeth which extend substantially radially and allows axial engagement of a corresponding toothing 52 on an end side 54 of the drive shaft 46. In the resultant rotational coupling position which can be seen in FIG. 2, the sets of toothing 50, 52 engage in one another in a form-fitting manner in the circumferential direction and thus serve to transmit torque between the drive shaft 46 and the flexiplate 48 or the torque converter 10 from FIG. 1.

To ensure that, when the two sets of toothings 50, 52 have engaged in one another, these sets of toothings 50, 52, which could otherwise be removed from one another in the axial direction, are held in the engaged position, a preloading device 56 is provided. This preloading device 56 comprises a first support ring 58, which is guided in an axially movable but rotationally fixed manner radially on the inside on the projection 42 of the torque converter 10, for example by means of a toothing 60 which engages in longitudinal toothing 62 on the projection 42. Furthermore, a securing ring 64 is fixed to the projection 42, for example by latching into a groove, which securing ring 64 ultimately forms a movement limit stop for the first support ring 58 or itself forms a second support ring. Between the rings 58 and 64 there is a preloading spring 66, for example a diaphragm spring 66, which is supported on the two rings 64, 58 and thus presses the ring 58 away from the ring 64 until the ring 58 ultimately comes to bear against a shoulder 68, which forms the ending of the longitudinal toothing 62, of the projection 42 (cf. FIG. 2). On its outer circumferential surface, the first support ring 58 has an external screw thread 70 which can be brought into threaded engagement with an internal screw thread 72 in the recess 44 in the drive shaft 46.

To produce this connected state illustrated in FIG. 2, the procedure is as follows: the torque converter 10, together with the flexiplate 48 provided thereon, is initially guided onto the drive shaft 46 or an engine block 74 on which the latter is mounted until the flexiplate 48 comes into contact with an opposing force element 76. This opposing force element may, for example, be a balloon (or a plurality of balloons) or a bellows, which in the position illustrated in FIG. 3 is filled and initially prevents further movement of the flexiplate 48 with the toothing 50 provided on it, before the toothing 50 comes into engagement with the toothing 52. This opposing force device 76, i.e. the balloon or a plurality of balloons, is preferably installed in a fixed position on the engine block 74 and, in order to carry out fitting operations, can be filled with a fluid, for example air or a liquid. In this state, the first support ring 58 with its external screw thread 70 is then guided axially onto the internal screw thread 72 of the drive shaft 46, and by subsequent rotation of the drive shaft 46, for example in the normal direction of rotation of the engine, the first support ring 58, which is otherwise held in a rotationally fixed manner, is drawn into threaded engagement with the drive shaft 46, until ultimately the end area of the internal screw thread 72 is reached and thus the first support ring 58 is held on the drive shaft 46 in an axially fixed and also, in at least one direction, rotationally fixed manner. The rotationally fixed positioning of the first support ring 58 is achieved by connecting it in a rotationally fixed manner to the projection 42 which in turn is fixed to the converter 10. In this assembly situation, the converter 10 can then be blocked so that it cannot rotate, by external means or simply by means of the opposing force device 76. If, with regard to the preloading device 56, the situation shown in FIG. 3 has then been reached, i.e. the first support ring 58 has been screwed into the internal screw thread 72, this represents a state in which the diaphragm spring 66 is also substantially fully compressed and is clamped in between the first support ring 58 and the second support ring 64. Then, the opposing force device 76 is set to end the generation of the opposing force, for example the fluid contained therein is released outward, so that the opposing force device 76 adopts the inactive position which can be seen in FIG. 2 and in which its axial length is reduced. Then, when the opposing force is eliminated, the entire torque converter moves axially onto the drive shaft 46 until the two sets of toothings 50, 52 enter into one another, substantially as a result of the preloading force generated by the spring 66. This movement continues until the first support ring 58 reaches the position with respect to the projection 42 which can be seen in FIG. 2, i.e. butts against the shoulder 68. This is a position in which the sets of toothings 50, 52 have also fully entered one another and, if appropriate, the flexiplate 48 is also slightly preloaded. In this position, a rotationally fixed connection has been created via the two sets of toothings 50, 52, and an axial preloading force has been provided, which maintains this toothed engagement. The axial preloading force is generated by the diaphragm spring 66, which is still held in the preloaded state between the support rings 58, 64.

It should be noted that, if appropriate, the drive shaft 46 can be rotated slightly during the transition from the position illustrated in FIG. 3 to the position illustrated in FIG. 2, in order for it to be possible to position the two sets of toothings 50, 52 in a suitable manner relative to one another, so that they can enter one another.

In addition to the preloading force generated by the spring 66, in operation the converter thrust which is generated also ensures that the sets of toothings 50, 52 are always held in suitable engagement so as to transmit the entire torque. When at a standstill, the preloading spring 66 prevents the two sets of toothings 50, 52 from becoming separated in the axial direction.

It should be noted that the toothing 50 is not necessarily provided on the flexiplate 48. For example, it could also be provided directly on the converter casing or the casing cover 14, surrounding the projection 42. However, interposition of the flexiplate enables the converter to execute at least slight tumbling movements, as mentioned above, with respect to the drive shaft. It is also possible for the opposing force device 76, i.e. the inflatable balloon or balloons, to be arranged not on the engine block 74, but rather on the flexiplate 48 or the converter casing 12. It is also conceivable for some of the balloons to be provided on the engine block and some of the balloons to be provided on the converter.

Furthermore, it should be noted that the axial positioning of the toothing 50 with respect to the first support ring 58 in the uninstalled state is such that, when the torque converter, which is ultimately prefitted with the preloading device 56, is being guided onto the drive shaft 46, the external screw thread 70 is already in contact with the internal screw thread 72, so that rotation of the drive shaft 46 inevitably leads to the threaded engagement being produced before the toothing 50 can engage in the toothing 52. Also, the axial length of the internal screw thread 72 is selected in such a manner that, in the position in which the two sets of toothings 50, 52 are still prevented from entering one another by the opposing force device 76, the first support ring 58 reaches the end of the inner toothing 72 before the diaphragm spring 76 is fully compressed or as soon as this fully compressed state is reached.

By means of the arrangement according to the invention, it is possible to ensure, in a simple manner, that an axial and a rotationally fixed coupling is generated between the drive shaft and the converter without it being necessary to tighten a large number of screws or other connecting elements. The only threaded engagement which has to be produced, between the first support element and the drive shaft, is ultimately generated by rotation of the drive shaft, the opposing force device, for example, ensuring that the torque converter is rotationally fixed, or if appropriate a fitter may hold the converter so that it cannot rotate.

It should also be noted that the two sets of toothings do not necessarily have to be axial toothing, as illustrated, i.e. toothings with teeth sections which extend substantially radially and can be introduced into one another in the axial direction. Rather, any form-fitting connection which can be produced by pushing the components axially into one another is possible. The important factor is that the engagement formation provided on the converter and the engagement formation provided on the drive shaft are not of rotationally symmetrical design at least in certain areas. It is also possible to have an external radial toothing on one of the components, i.e. converter and drive shaft, and an internal radial toothing on the other component.

Although the present invention has been described in detail above with reference to a torque converter, it will be clear that the arrangement according to the invention can be used for any type of hydrodynamic coupling device, i.e., for example, also for a fluid or hydraulic clutch.

The invention is not limited by the embodiments described above which are presented as examples only but can be modified in various ways within the scope of protection defined by the appended patent claims.

We claim:

1. An arrangement for a rotationally fixed connection of a hydrodynamic coupling device to a drive component, comprising:

a first torque-transmission engagement formation which is connected in a rotationally fixed manner to the drive component;

a second torque-transmission engagement formation which is connected in a rotationally fixed manner to the coupling device and is bringable into torque-transmitting engagement with the first torque-transmission engagement formation as a result of the formations being moved toward one another substantially in a direction of an axis of rotation;

preloading means for preloading the coupling device with respect to the drive component substantially in the direction of the axis of rotation, the first and second torque-transmission engagement formations being one of brought into and held in torque-transmitting engagement with one another by preloading force generated by the preloading means; and an opposing force device which is able to generate an opposing force which is directed substantially opposite to the preloading force generated by the preloading means, the opposing force device being operative to generate the opposing force when the coupling device moves onto the drive component in the axial direction, until the preloading means has moved into a fitted limit position, and then ceases to generate the opposing force, in order for the first and second engagement formations to be brought into engagement with one another by the preloading force generated by the preloading means.

2. An arrangement as defined in claim 1, wherein the first and second torque-transmission engagement formations each comprise a radial toothing which is open axially toward the other respective torque-transmission engagement formation in the direction of the axis of rotation.

3. An arrangement as defined in claim 1, wherein the coupling device has a projection which protrudes from the coupling device in the direction of the axis of rotation, the preloading means being arranged to act between the projection and the drive component.

4. An arrangement as defined in claim 3, wherein the preloading means includes a first support element on the drive component, a second support element on the projection, and a preloading spring arrangement arranged to act between the first and second support elements.

5. An arrangement as defined in claim 4, wherein the second support element is axially fixed to the projection.

6. An arrangement as defined in claim 4, wherein the first support element is axially fixed to the drive component and is held in an axially movable but rotationally fixed manner on the projection.

7. An arrangement as defined in claim 4, wherein the first support element is connectable to the drive component in an axially fixed manner by a threaded engagement.

8. An arrangement as defined in claim 7, wherein the first support element has an external screw thread formation which is engagable with an internal screw thread formation provided on the drive component.

9. An arrangement as defined in claim 1, wherein the opposing force device is arranged on a device which bears the drive component.

10. An arrangement as defined in claim 9, wherein the opposing force device is arranged on an engine block.

11. An arrangement as defined in claim 1, wherein the opposing force device is arranged in a rotationally fixed manner on one of the coupling device and a component which is connected to the coupling device.

12. An arrangement as defined in claim 1, wherein the opposing force device end is operative to generation of the opposing force by reducing axial length of the opposing force device.

13. An arrangement as defined in claim 12, wherein the axial length of the opposing force device is changeable by altering fluid pressure.

* * * * *